(12) United States Patent
Koker et al.

(10) Patent No.: US 9,471,323 B2
(45) Date of Patent: Oct. 18, 2016

(54) SYSTEM AND METHOD OF USING AN ATOMIC DATA BUFFER TO BYPASS A MEMORY LOCATION

(71) Applicant: Intel Corporation, Santa Clara, CA (US)

(72) Inventors: Altug Koker, El Dorado Hills, CA (US); Jayakrishna P. S, Bangalore (IN); Pattabhiraman K, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/045,515

(22) Filed: Oct. 3, 2013

(65) Prior Publication Data

US 2015/0100749 A1    Apr. 9, 2015

(51) Int. Cl.
*G06F 3/00* (2006.01)
*G06F 9/38* (2006.01)
*G06F 9/30* (2006.01)
G06F 12/08 (2016.01)

(52) U.S. Cl.
CPC ........... *G06F 9/3826* (2013.01); *G06F 9/3004* (2013.01); *G06F 9/3834* (2013.01); *G06F 12/0831* (2013.01); *Y02B 60/1225* (2013.01)

(58) Field of Classification Search
None
See application file for complete search history.

(56) References Cited

U.S. PATENT DOCUMENTS

2015/0046655 A1* 2/2015 Nystad et al. ................ 711/125

FOREIGN PATENT DOCUMENTS

| JP | 2003524248 A | 8/2003 |
| JP | 2010061498 A | 3/2010 |
| JP | 2013182373 A | 9/2013 |

OTHER PUBLICATIONS

Office Action for Japanese Patent Application No. 2014-190035, mailed Aug. 4, 2015, 10 pages including 5 pages English translation.

* cited by examiner

*Primary Examiner* — Idriss N Alrobaye
*Assistant Examiner* — Richard B Franklin
(74) *Attorney, Agent, or Firm* — Jordan IP Law, LLC

(57) ABSTRACT

Methods and systems may provide for receiving a request to perform an atomic operation and adding the atomic operation to an execution pipeline of an arithmetic logic unit (ALU) for one or more pending atomic operations if the one or more pending atomic operations are associated with a memory location identified in the request. Additionally, at least a portion of the execution pipeline may bypass the memory location. In one example, adding the atomic operation to the execution pipeline includes populating a linked list with a modification associated with the atomic operation, wherein the linked list is dedicated to the memory location.

24 Claims, 6 Drawing Sheets

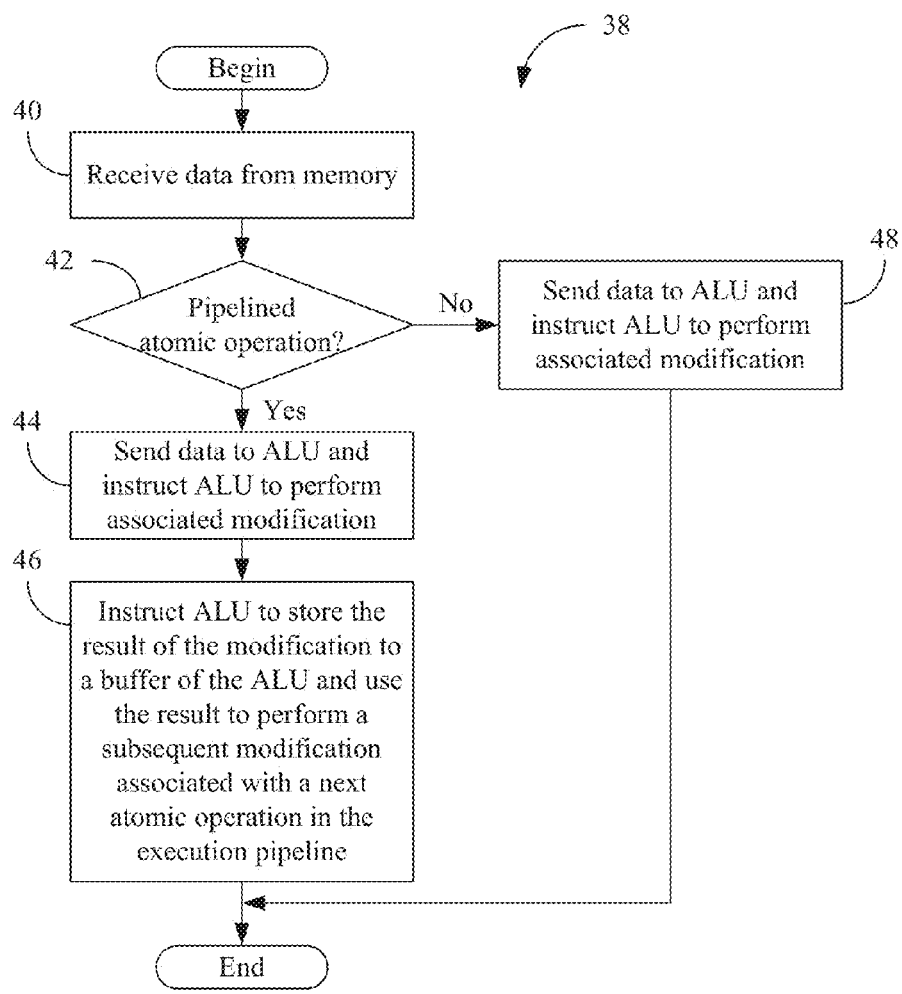

SYSTEM AND METHOD OF USING AN ATOMIC DATA BUFFER TO BYPASS A MEMORY LOCATION

BACKGROUND

An atomic operation may involve reading data from a memory location, modifying the data and writing the modified data back to the memory location, without any other accesses being permitted to the memory location in between. If back-to-back atomic operations are requested, subsequent atomic operations may wait for their predecessors to complete in sequence. In certain circumstances, an arithmetic logic unit (ALU) is used to modify the data according to the atomic operation, wherein the ALU is separate from the memory (e.g., bulk storage) housing the data that is being operated on. Thus, for each atomic operation, data may be fetched from the memory, modified by the ALU and returned to the memory once the data modification is complete. These fetches and returns may take a relatively long amount of time (e.g., tens of clock cycles) to complete. Indeed, when several atomic operations line up back-to-back, between every two atomic operations, double the number of clock periods may be spent ferrying the data back and forth between the memory and the ALU. As a result, a relatively long loop of atomic accesses may be experienced, which may in turn degrade performance and/or battery life.

BRIEF DESCRIPTION OF THE DRAWINGS

The various advantages of the embodiments will become apparent to one skilled in the art by reading the following specification and appended claims, and by referencing the following drawings, in which:

FIG. 3 is an illustration of an example of a set of linked lists according to an embodiment;

FIG. 4 is a flowchart of an example of a method of processing data received from memory according to an embodiment;

DETAILED DESCRIPTION

Figure 1:
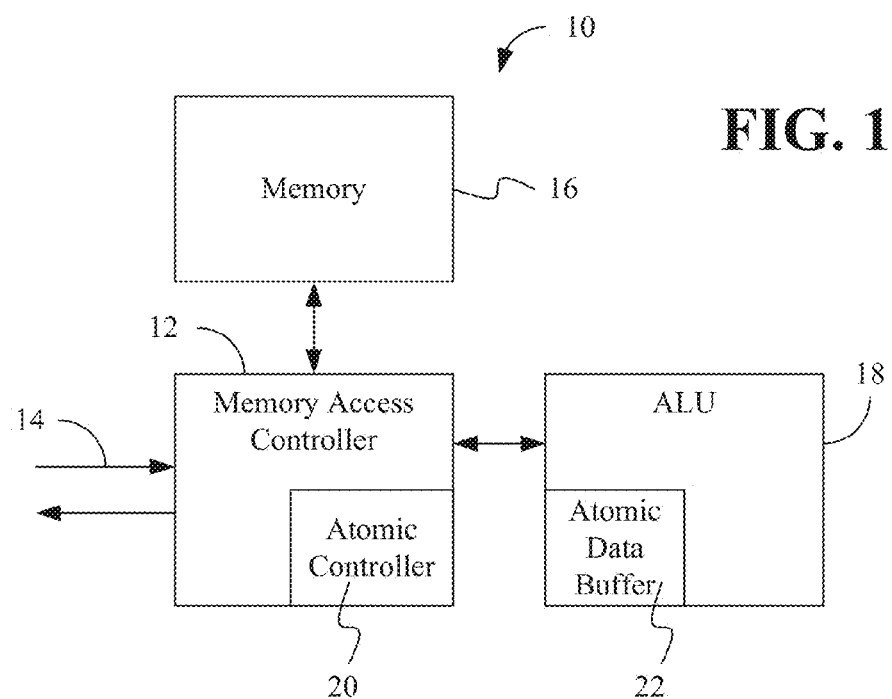
FIG. 1 is a block diagram of an example of a memory architecture according to an embodiment.

FIG. 1 shows a memory architecture 10 in which a memory access controller 12 receives a plurality of atomic operation requests 14 from various clients (e.g., graphics execution units, host processors, drivers, operating system/OS components, etc.) of a computing system and/or platform. The atomic operations (e.g., "atomics") may include logical and/or arithmetic modification operations such as, for example, Add, Subtract, Increment, Decrement, Max, Min, AND, OR, XOR, Compare, and so forth, on data residing in a memory 16, wherein each request 14 may identify one or more locations (e.g., addresses) in the memory 16 corresponding to the data to be modified. In one example, the modification operations are performed by an arithmetic logic unit (ALU) 18 that is separate from the memory 16 but associated with the memory access controller 12. Moreover, the atomic operations may be related to content to be visually presented on a display (not shown). The memory 16 might include, for example, a cache (e.g., graphics cache, last level cache/LLC, etc.), bulk storage (e.g., hard disk drive/HDD, read only memory/ROM, optical memory, flash memory, solid state drive/SSD, etc.), or any other addressable memory device.

In the illustrated example, the memory access controller 12 includes an atomic controller 20 that forms an execution pipeline for the atomic operations, wherein at least a portion of the execution pipeline bypasses the memory 16. The ALU 18 may also include an atomic data buffer 22 that is used to store data for the execution pipeline. The depth of the atomic data buffer 22 may be set based on the number of parallel atomic streams to be encountered. As will be discussed in greater detail, the memory access controller 12 may be configured to receive a particular request 14 to perform an atomic operation and add the atomic operation to an execution pipeline of the ALU 18 for one or more pending atomic operations if the one or more pending atomic operations are associated with the memory location identified in the request 14. Additionally, at least a portion of the execution pipeline may use the atomic data buffer 22 and bypass the memory location.

Figure 2:
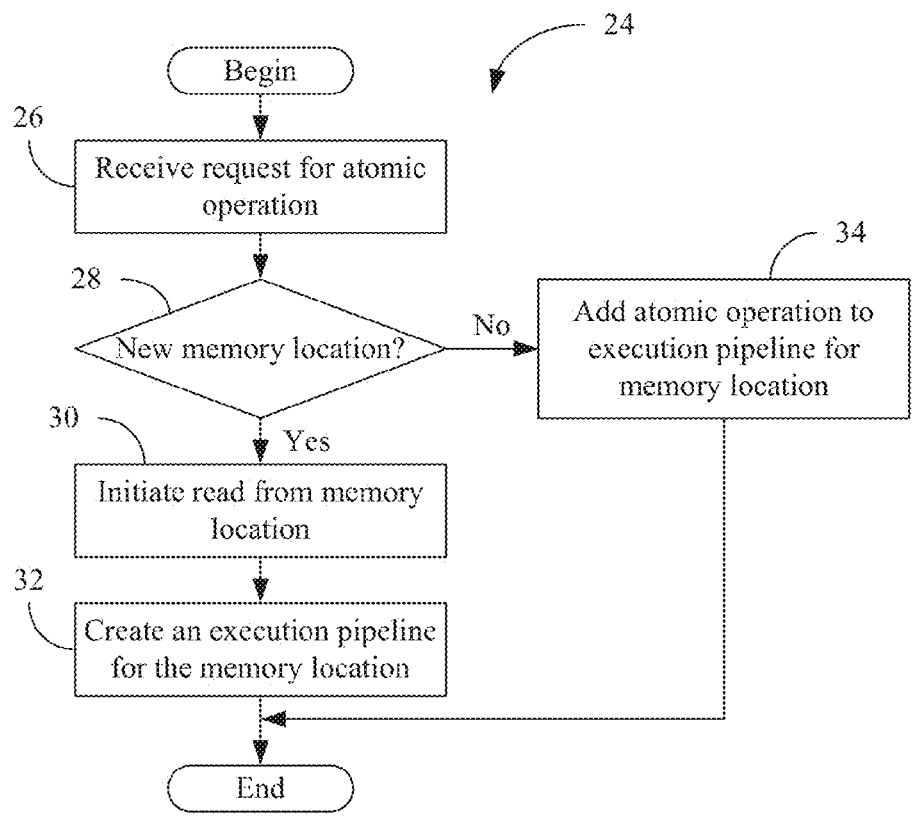
FIG. 2 is a flowchart of an example of a method of pipelining atomic operations according to an embodiment.

Turning now to FIG. 2, a method 24 of pipelining atomic operations is shown. The method 24 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. In one example, the method 24 is incorporated into the functionality of a memory access controller such as, for example, the memory access controller 12 (FIG. 1).

Illustrated processing block 26 provides for receiving a request to perform an atomic operation, wherein a determination may be made at block 28 as to whether a memory location (e.g., address) identified in the received request has previously been encountered in an atomic operation. Thus, if the memory location has previously been encountered, there may be pending atomic operations (e.g., back-to-back atomics) upon which the currently requested atomic operation depends. If, on the other hand, the memory location has not been previously encountered (e.g., the memory location is "new"), it may be inferred that there are no such dependencies. Accordingly, if block 28 determines that the memory location in the received request is new (e.g., no pending atomic operations are associated with the memory location), block 30 may initiate a read from that memory location and block 32 may create an execution pipeline for the memory location in question. If block 28 determines that the memory location in the received request is not new (e.g., one or more pending atomic operations are associated with the memory location), the atomic operation may be added to a pre-existing execution pipeline for that memory location at block 34.

Of particular note is that the path of block 34 bypasses the read from the memory location. Bypassing the data read may effectively shorten the memory access loop for dependent atomic operations and may in turn significantly enhance performance, and/or battery life. As will be discussed in greater detail, an atomic data buffer may be used to bypass the read from the memory location.

FIG. 3 shows a set of linked lists 36 (36*a*, 36*b*) that may be used to manage execution pipelines for atomic operations. In the illustrated example, a first linked list 36*a* tracks each request, modification operation and parent atomic operation for a particular memory location ("Memory Location A"), a second linked list 36*b* tracks each request, modification operation and parent atomic operation for another memory location ("Memory Location B"), and so forth. Thus, adding an atomic operation to an execution pipeline may involve populating one of the linked lists 36 with a modification associated with the atomic operation, wherein the linked lists 36 may be dedicated to memory locations. In the illustrated example, the execution pipeline for memory location "A" may bypass memory location A to the extent that requests A1-A3 do not trigger reads from memory location A, the execution pipeline for memory location "B" may bypass memory location B to the extent that requests B1-B3 do not trigger reads from memory location B, and so forth. Moreover, the linked lists 36 may be maintained in parallel for each location in a memory such as, for example, the memory 16 (FIG. 1), already discussed.

FIG. 4 shows a method 38 of processing data received from a memory location. The method 38 may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In one example, the method 38 is incorporated into the functionality of a memory access controller such as, for example, the memory access controller 12 (FIG. 1).

Illustrated processing block 40 provides for receiving data from memory, wherein the data may be associated with a request to perform an atomic operation. Block 40 may therefore result from a read initiation block such as, for example, block 30 (FIG. 2). The time period between initiation of the read and receipt of the data may be relatively long depending upon the memory structure and/or data retrieval protocol. A determination may be made at block 42 as to whether the received data corresponds to a pipelined atomic operation. The determination at block 42 may therefore involve comparing the memory location from which the data was retrieved to one or more linked lists such as, for example, the linked lists 36 (FIG. 3). In such a case, the existence of a linked list for the memory location in question may lead to a determination that the data corresponds to a pipelined atomic operation.

If the received data corresponds to a pipelined atomic operation, illustrated block 44 sends the data to an ALU and instructs the ALU to perform a modification associated with the atomic operation in question. Additionally, block 46 may use one or more pipeline commands to instruct the ALU to store the result of the modification to a buffer of the ALU and use the result to perform a subsequent modification associated with a next atomic operation in the execution pipeline. Thus, with continuing reference to FIGS. 3 and 4, if the data received from memory corresponds to the "A0" request to perform an atomic operation with respect to memory location "A", block 44 might instruct the ALU to perform the associated increment modification on the received data. Moreover, block 46 might instruct the ALU to store the result of the increment modification to a buffer such as, for example, the atomic data buffer 22 (FIG. 2), and use the result to perform the increment modification of the next atomic operation "A1" in the appropriate execution pipeline. If, on the other hand, block 42 determines that the received data does not correspond to a pipelined atomic operation (e.g., there are no atomic data dependencies), illustrated block 48 sends the data to the ALU and instructs the ALU to perform the associated modification without using the atomic data buffer. Alternatively, the method 32 may omit the determination at block 42 and instruct the ALU to use the atomic data buffer for all atomic operations.

Figure 5:
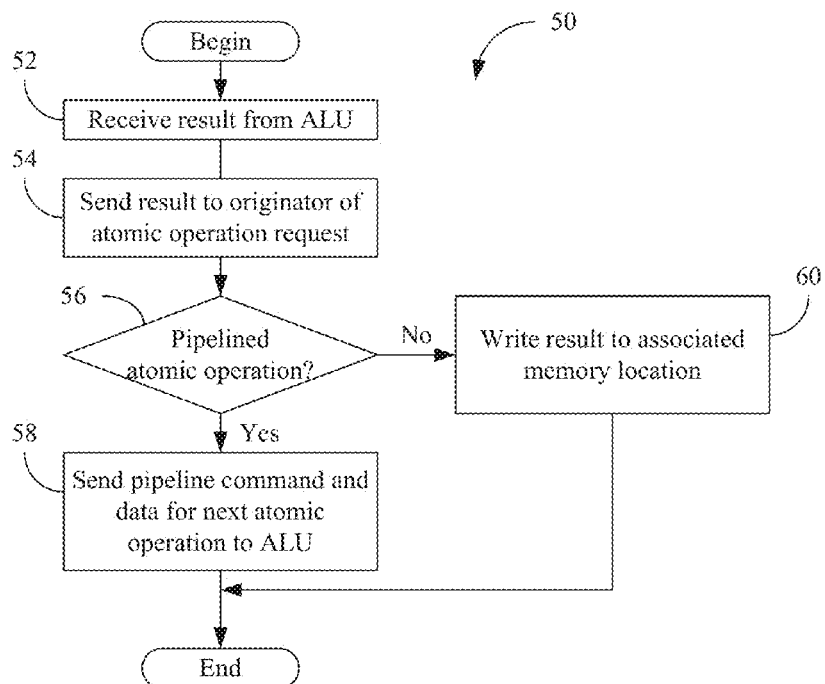
FIG. 5 is a flowchart of an example of a method of processing results received from an ALU according to an embodiment.

FIG. 5 shows a method 50 of processing results received from an ALU. The method 50 may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In one example, the method 50 is incorporated into the functionality of a memory access controller such as, for example, the memory access controller 12 (FIG. 1).

Illustrated processing block 52 provides for receiving a result of an atomic operation from an ALU. Block 52 may therefore result from a modification request block such as, for example, block 44 (FIG. 4), already discussed. The result may be sent to an originator (e.g., client) of the corresponding atomic operation at block 54, wherein illustrated block 56 determines whether the corresponding atomic operation is part of an execution pipeline. The determination at block 56 may therefore involve comparing the atomic operation result to one or more linked lists such as, for example, the linked lists 36 (FIG. 3).

If it is determined that the result is associated with an execution pipeline for an atomic operation, block 58 may provide for identifying the next atomic operation in the pipeline, instructing the ALU to perform a subsequent modification associated with the next atomic operation and sending a pipeline command for the next atomic operation to the ALU. The pipeline command may instruct the ALU to use data stored in the atomic data buffer (e.g., the result of the last atomic operation) to perform the subsequent modification. Thus, with continuing reference to FIGS. 3 and 5, if the result received corresponds to the "B2" request to perform an atomic operation with respect to memory location "B", block 58 might instruct the ALU to retrieve the result of the "B1" request (e.g., the parent request) from the atomic data buffer and use that result (e.g., rather than data from memory) to perform the B2 modification.

If, on the other hand, it is determined at block 56 that the corresponding atomic operation is not part of an execution pipeline, either the last atomic operation in the execution pipeline has been encountered or the current atomic operation had no previous dependencies. In such a case, illustrated block 60 writes the result to the associated memory location. Deferring the write until the result of the last atomic operation has been received from the ALU may further reduce power consumption and extend battery life.

Figure 6:
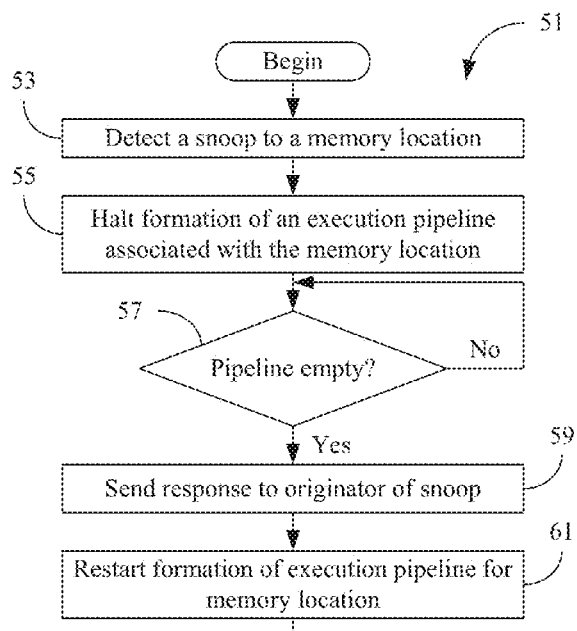
FIG. 6 is a flowchart of an example of a method of processing snoops according to an embodiment.

FIG. 6 shows a method 51 of processing snoops to a memory location. The method 51 may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In one example, the method 51 is incorporated into the functionality of a memory access controller such as, for example, the memory access controller 12 (FIG. 1).

Illustrated processing block 53 detects a snoop to a memory location associated with an atomic operation. The snoop, which may be received from another memory controller and/or device, may be associated with an effort to maintain coherency between two or more memory structures and/or devices. Illustrated block 55 halts formation of an execution pipeline associated with the memory location in response to the snoop, wherein block 55 may also provide for flushing the appropriate data out of the atomic data buffer. A determination may be made at block 57 as to whether all requests associated with the execution pipeline are complete (e.g., the execution pipeline is empty). If so, a response may be sent to the originator of the snoop at block 59 and illustrated block 61 restarts formation of the execution pipeline for the memory location in question.

Figure 7:
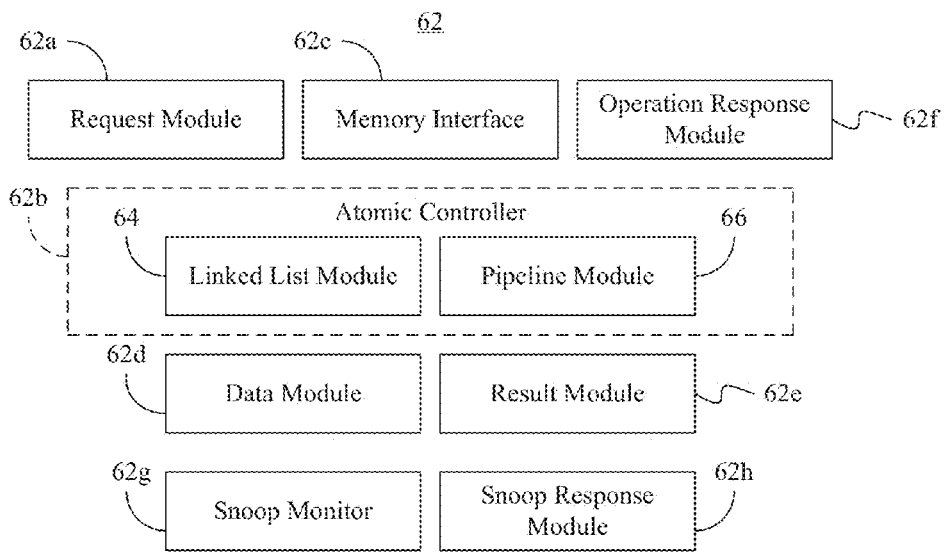
FIG. 7 is a block diagram of an example of a logic architecture according to an embodiment.

FIG. 7 shows a logic architecture 62 (62a-62h) that may pipeline atomic operations. The architecture 62 may therefore generally be implemented as a memory access controller such as, for example, the memory access controller 12 (FIG. 1) and/or the methods 24, 38, 50, 51 (FIGS. 2, 4, 5, 6, respectively). In the illustrated example, a request module 62a receives requests to perform atomic operations and an atomic controller 62b adds a given atomic operation to an execution pipeline of an ALU for one or more pending atomic operations if the one or more pending atomic operations are associated with a memory location identified in the request. As already noted, at least a portion of the execution pipeline may bypass the memory location identified in the request.

In particular, the atomic controller 62b may include a linked list module 64 that populates a linked list with a modification associated with the atomic operation to add the atomic operation to the execution pipeline. As already noted, the linked list may be dedicated to the memory location. The illustrated architecture 62 also includes a memory interface 62c to initiate a read from the memory location if no pending atomic operations are associated with the memory location and receive data from the memory location. In this regard, the atomic controller 62b may also include a pipeline module 66 to create an execution pipeline for the memory location. Additionally, a data module 62d may send the data to the ALU and instruct the ALU to perform a modification associated with the atomic operation. The modification might include, for example, an Add, Subtract, Increment, Decrement, Max, Min, AND, OR, XOR and/or Compare operation. The pipeline module 66 may also instruct the ALU to store the result of the modification to an atomic data buffer of the ALU.

The illustrated architecture 62 also includes a result module 62e configured to receive a result of the atomic operation from the ALU and an operation response module 62f configured to send the result to an originator of the request to perform the atomic operation. The pipeline module 66 may also identify the next atomic operation in the execution pipeline, instruct the ALU to perform a subsequent modification associated with the next atomic operation and send a pipeline command to the ALU. The pipeline command may instruct the ALU to use data stored in the atomic data buffer to perform the subsequent modification. Additionally, the memory interface 62c may defer a write to the memory location until a result of the last atomic operation in the execution pipeline is received from the ALU.

The architecture 62 may also include a snoop monitor 62g to detect a snoop to the memory location, wherein the atomic controller 62b may halt formation of an execution pipeline associated with the memory location in response to the snoop. Additionally, a snoop response module 62h may send a response to an originator of the snoop if all requests associated with the execution pipeline are complete and flush the appropriate data out of the atomic data buffer after serving the snoop. Thus, the atomic controller 62b may restart formation of the execution pipeline after the response is sent to the originator of the snoop.

Figure 8A:
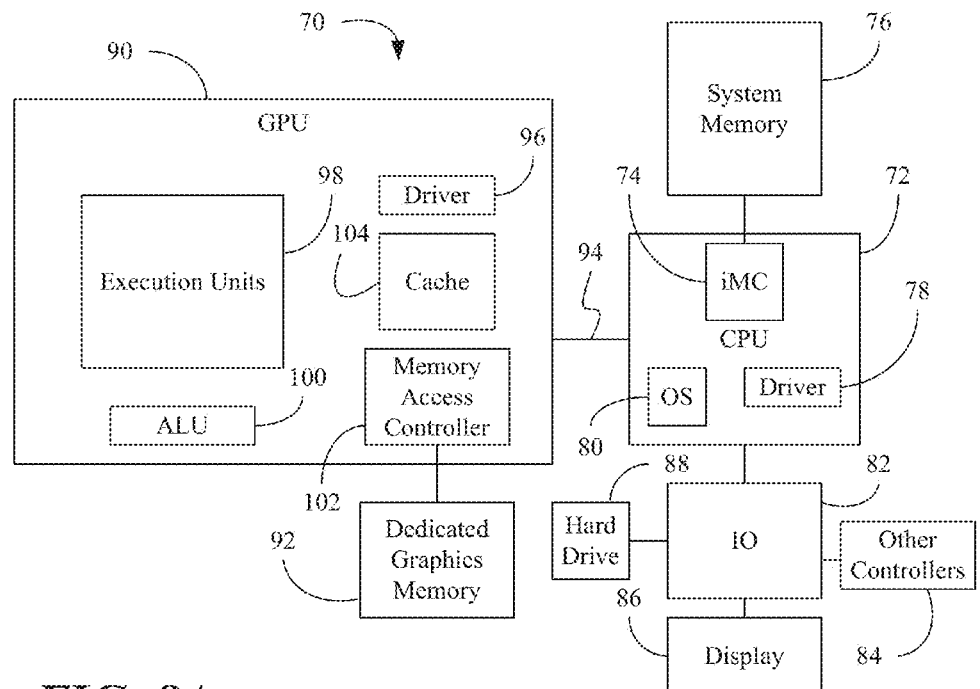
FIG. 8A is a block diagram of an example of a system according to an embodiment.

Turning now to FIG. 8A, a computing system 70 is shown, wherein the system 70 may be part of a mobile platform such as a laptop, mobile Internet device (MID), personal digital assistant (PDA), media player, imaging device, etc., any smart device such as a smart phone, smart tablet, smart TV (television) and so forth, or any combination thereof. The system 70 may also be part of a fixed platform such as a personal computer (PC), server, workstation, etc. The illustrated system 70 includes a central processing unit (CPU, e.g., host processor) 72 with an integrated memory controller (iMC) 74 that provides access to system memory 76, which could include, for example, double data rate (DDR) synchronous dynamic random access memory (SDRAM, e.g., DDR3 SDRAM JEDEC Standard JESD79-3C, April 2008) modules. The modules of the system memory 76 may be incorporated, for example, into a single inline memory module (SIMM), dual inline memory module (DIMM), small outline DIMM (SODIMM), and so on.

The CPU 72 may also have one or more drivers 78 and/or processor cores (not shown), where each core may be fully functional with instruction fetch units, instruction decoders, level one (L1) cache, execution units, and so on. The CPU 72 could alternatively communicate with an off-chip variation of the iMC 74, also known as a Northbridge, via a front side bus or a point-to-point fabric that interconnects each of the components in the system 70. The CPU 72 may also execute an operating system (OS) 80.

The illustrated CPU 72 communicates with an input/output (IO) module 82, also known as a Southbridge, via a bus. The iMC 74/CPU 72 and the IO module 82 are sometimes referred to as a chipset. The CPU 72 may also be operatively connected to a network (not shown) via a network port through the IO module 82 and various other controllers 84. Thus, the other controllers 84 could provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/ IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes.

The IO module 82 may also communicate with a display 86 to provide for the visual output/presentation of video, images, and other content. The other controllers 84 could also communicate with the IO module 82 to provide support for user interface devices (not shown) such as a keypad, mouse, etc., in order to allow a user to interact with and perceive information from the system 70.

The IO module 82 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 88 is also coupled to storage, which may include a hard drive 88, read only memory (ROM), optical disk, flash memory (not shown), etc.

The illustrated system 70 also includes a dedicated graphics processing unit (GPU) 90 coupled to a dedicated graphics memory 92. The dedicated graphics memory 92 could include, for example, GDDR (graphics DDR) or DDR SDRAM modules, or any other memory technology suitable for supporting graphics rendering. The GPU 90 and graphics memory 92 might be installed on a graphics/video card, wherein the GPU 90 may communicate with the CPU 72 via a graphics bus 94 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 72 die, configured as a discrete card on the motherboard, etc. The GPU 90 may also execute one or more drivers 96, and may include one or more execution units 98, an ALU 100, a memory access controller 102 and an internal cache 104 to store instructions and other data.

As already discussed, the memory access controller 102 may generally be configured to receive requests to perform atomic operations with respect to visual content and/or data in the dedicated graphics memory 92 and add a given atomic operation to an execution pipeline of the ALU 100 for one or more pending atomic operations if the one or more pending atomic operations are associated with a memory location identified in the request. Moreover, at least a portion of the execution pipeline may bypass the dedicated graphics memory 92 and use an atomic data buffer of the ALU 100. Such an approach may significantly improve the performance, power consumption and/or battery life of the system 70. The illustrated hard drive 88, system memory 76 and/or cache 104 may also be used to store data that is modified by one or more atomic operations, wherein the functionality of the memory access controller 102 may be incorporated into access controllers corresponding to those memory structures.

Figure 8B:
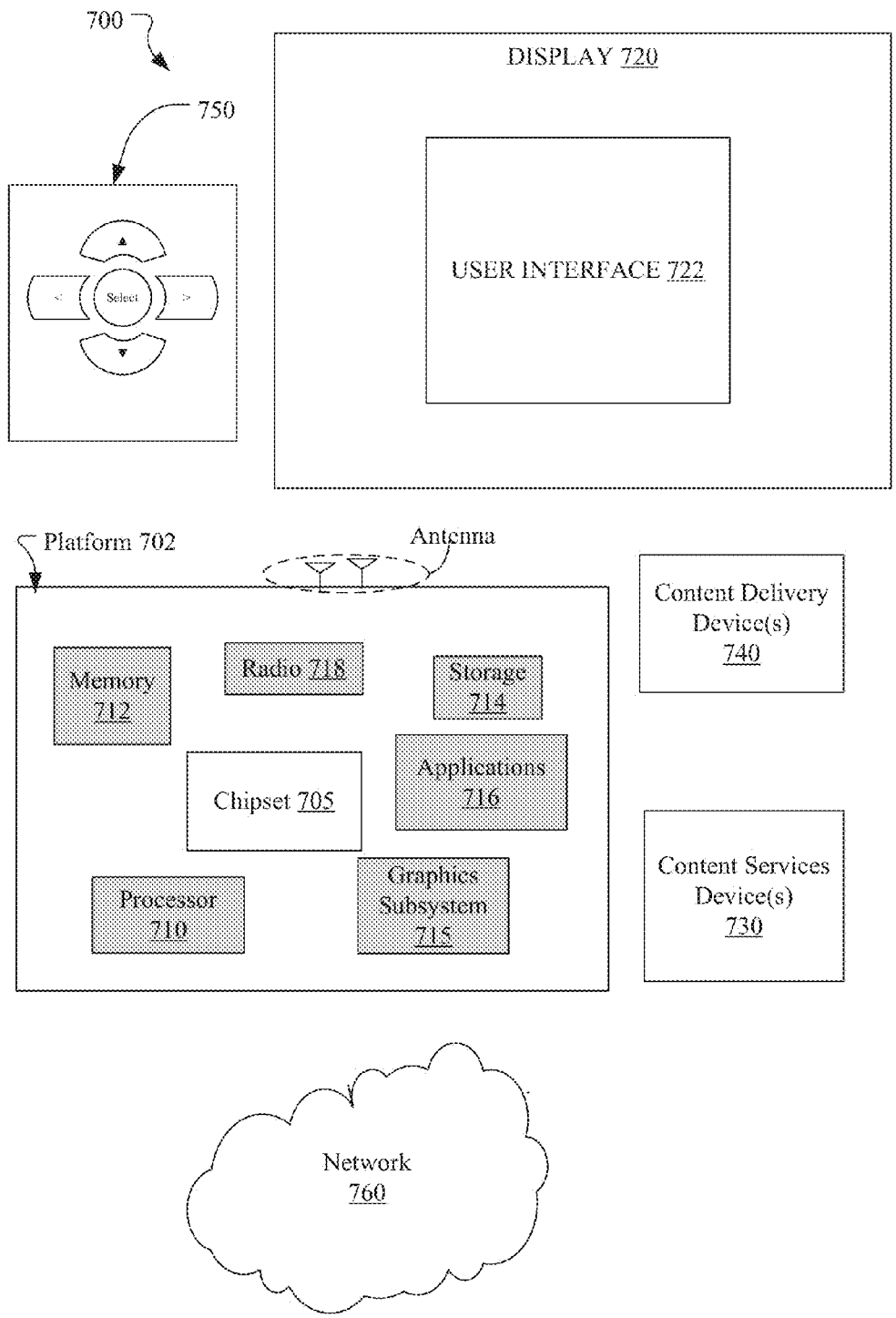
FIG. 8B is a block diagram of an example of a system having a navigation controller according to an embodiment.

FIG. 8B illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to render images as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 90 (FIG. 8), already discussed. In addition, the processor 710 may be configured to operate as the CPU 72 (FIG. 8), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8B.

Figure 8C:
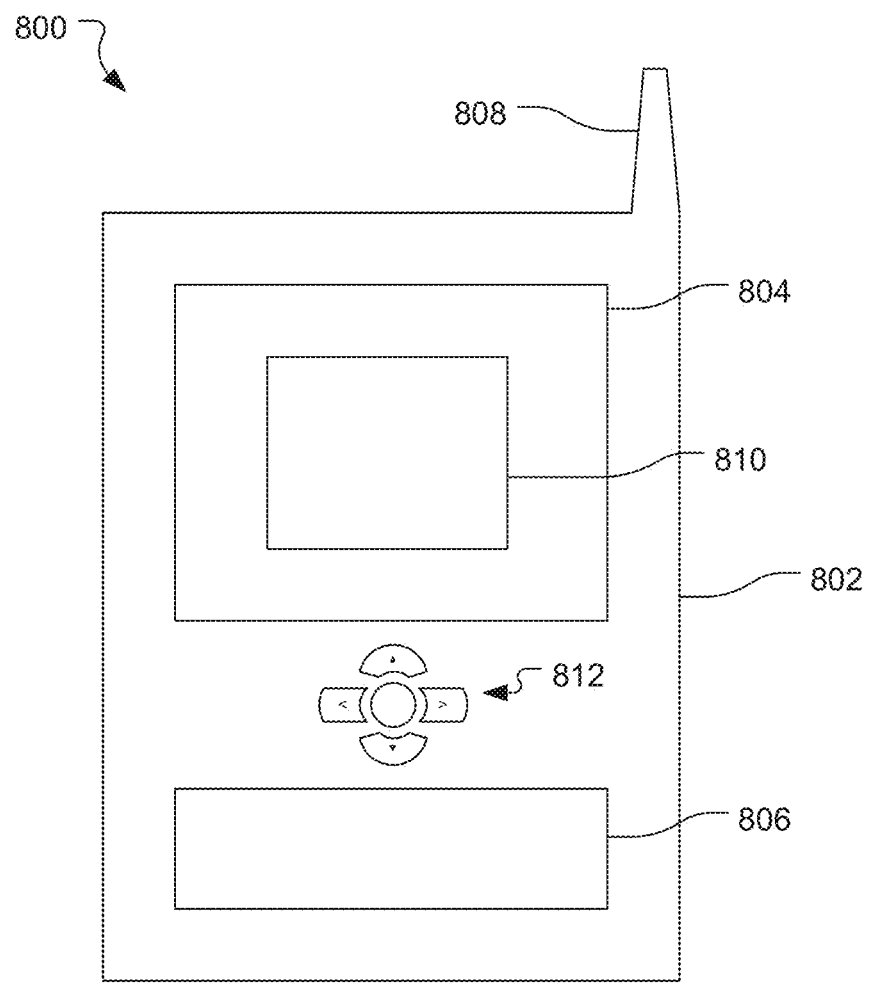
FIG. 8C is a block diagram of an example of a system having a small form factor according to an embodiment.

As described above, system 700 may be embodied in varying physical styles or form factors. FIG. 8C illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8C, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system comprising a display to visually present content, a memory device including a memory location, an arithmetic logic unit (ALU) including an atomic data buffer and a memory controller coupled to the memory device and the ALU. The memory access controller may include a request module to receive a request to perform an atomic operation with respect to the content, the request identifying the memory location, and an atomic controller to add the atomic operation to an execution pipeline of the ALU for one or more pending atomic operations in response to association of the one or more pending atomic operations with the memory location, wherein at least a portion of the execution pipeline bypasses the memory location and uses the atomic data buffer.

Example 2 may include the system of Example 1, wherein the atomic controller includes a linked list module to populate a linked list with a modification associated with the atomic operation to add the atomic operation to the execution pipeline, wherein the linked list is to be dedicated to the memory location.

Example 3 may include the system of Example 1, wherein the memory access controller further includes a memory interface to initiate a read from the memory location if no pending atomic operations are associated with the memory location and receive data from the memory location, wherein the atomic module includes a pipeline module to create an execution pipeline for the memory location, and a data module to send the data to the ALU and instruct the ALU to perform a modification associated with the atomic operation, wherein the pipeline module is to instruct the ALU to store a result of the modification to the atomic data buffer of the ALU.

Example 4 may include the system of any one of Examples 1 to 3, wherein the memory access controller further includes a result module to receive a result of the atomic operation from the ALU, an operation response module to send the result to an originator of the request to perform the atomic operation, wherein the atomic controller includes a pipeline module to identify a next atomic operation in the execution pipeline, instruct the ALU to perform a subsequent modification associated with the next atomic operation and send a pipeline command to the ALU, and a memory interface to defer a write to the memory location until a result of a last atomic operation in the execution pipeline is received from the ALU.

Example 5 may include the system of Example 4, wherein the pipeline command is to instruct the ALU to use data stored in the atomic data buffer to perform the subsequent modification.

Example 6 may include the system of Example 1, wherein the memory access controller further includes a snoop monitor to detect a snoop to the memory location, wherein the atomic controller is to halt formation of the execution pipeline in response to the snoop, and a snoop response module to send a response to an originator of the snoop if all requests associated with the execution pipeline are complete, wherein the atomic controller is to restart formation of the execution pipeline after the response is sent to the originator of the snoop.

Example 7 may include a method of operating a memory access controller, comprising receiving a request to perform an atomic operation and adding the atomic operation to an execution pipeline of an ALU for one or more pending atomic operations in response to association of the one or more pending atomic operations with a memory location identified in the request, wherein at least a portion of the execution pipeline bypasses the memory location.

Example 8 may include the method of Example 7, wherein adding the atomic operation to the execution pipeline includes populating a linked list with a modification associated with the atomic operation, wherein the linked list is dedicated to the memory location.

Example 9 may include the method of Example 7, further including initiating a read from the memory location if no pending atomic operations are associated with the memory location receiving data from the memory location, creating an execution pipeline for the memory location, sending the data to the ALU, instructing the ALU to perform a modification associated with the atomic operation, and instructing the ALU to store a result of the modification to an atomic data buffer of the ALU.

Example 10 may include the method of any one of Examples 7 to 9, further including receiving a result of the atomic operation from the ALU, sending the result to an originator of the request to perform the atomic operation, identifying a next atomic operation in the execution pipeline, instructing the ALU to perform a subsequent modification associated with the next atomic operation, sending a pipeline command to the ALU, and deferring a write to the memory location until a result of a last atomic operation in the execution pipeline is received from the ALU.

Example 11 may include the method of Example 10, wherein the pipeline command instructs the ALU to use data stored in the atomic data buffer to perform the subsequent modification.

Example 12 may include the method of Example 7, further including detecting a snoop to the memory location, halting formation of the execution pipeline in response to the snoop, sending a response to an originator of the snoop if all requests associated with the execution pipeline are complete, and restarting formation of the execution pipeline after the response is sent to the originator of the snoop.

Example 13 may include at least one computer readable storage medium comprising a set of instructions which, if executed by a memory access controller, cause the memory access controller to receive a request to perform an atomic operation and add the atomic operation to an execution pipeline of an ALU for one or more pending atomic operations in response to association of the one or more pending atomic operations with a memory location identified in the request, wherein at least a portion of the execution pipeline bypasses the memory location.

Example 14 may include the at least one computer readable storage medium of claim 13, wherein the instructions, if executed, cause the memory access controller to populate a linked list with a modification associated with atomic operation to add the atomic operation to the execution pipeline, wherein the linked list is to be dedicated to the memory location.

Example 15 may include the at least one computer readable storage medium of Example 13, wherein the instructions, if executed, cause the memory access controller to initiate a read from the memory location if no pending atomic operations are associated with the memory location, receive data from the memory location, create an execution pipeline for the memory location, send the data to the ALU, instruct the ALU to perform a modification associated with the atomic operation, and instruct the ALU to store a result of the modification to an atomic data buffer of the ALU.

Example 16 may include the at least one computer readable storage medium of any one of Examples 13 to 15, wherein the instructions, if executed, cause the memory access controller to receive a result of the atomic operation from the ALU, send the result to an originator of the request to perform the atomic operation, identify a next atomic operation in the execution pipeline, instruct the ALU to perform a subsequent modification associated with the next atomic operation, send a pipeline command to the ALU, and defer a write to the memory location until a result of a last atomic operation in the execution pipeline is received from the ALU.

Example 17 may include the at least one computer readable storage medium of Example 16, wherein the pipeline command is to instruct the ALU to use data stored in the atomic data buffer to perform the subsequent modification.

Example 18 may include the at least one computer readable storage medium of Example 13, wherein the instructions, if executed, cause a memory access controller to detect a snoop to the memory location, halt formation of the execution pipeline in response to the snoop, send a response to an originator of the snoop if all requests associated with the execution pipeline are complete, and restart formation of the execution pipeline after the response is sent to the originator of the snoop.

Example 19 may include a memory access controller, comprising a request module to receive a request to perform an atomic operation and atomic controller to add the atomic operation to an execution pipeline of an ALU for one or more pending atomic operations in response to association of the one or more pending atomic operations with a memory location identified in the request, wherein at least a portion of the execution pipeline bypasses the memory location.

Example 20 may include the memory access controller of Example 19, wherein the atomic controller includes a linked list module to populate a linked list with a modification associated with the atomic operation to add the atomic operation to the execution pipeline, wherein the linked list is to be dedicated to the memory location.

Example 21 may include the memory access controller of Example 19, further including a memory interface to initiate a read from the memory location if no pending atomic operations are associated with the memory location and receive data from the memory location, wherein the atomic module includes a pipeline module to create an execution pipeline for the memory location, and a data module to send the data to the ALU and instruct the ALU to perform a modification associated with the atomic operation, wherein the pipeline module is to instruct the ALU to store a result of the modification to an atomic data buffer of the ALU.

Example 22 may include the memory access controller of any one of Examples 19 to 21, further including a result module to receive a result of the atomic operation from the ALU, an operation response module to send the result to an originator of the request to perform the atomic operation, wherein the atomic controller includes a pipeline module to identify a next atomic operation in the execution pipeline, instruct the ALU to perform a subsequent modification associated with the next atomic operation and send a pipeline command to the ALU, and a memory interface to defer a write to the memory location until a result of a last atomic operation in the execution pipeline is received from the ALU.

Example 23 may include the memory access controller of Example 22, wherein the pipeline command is to instruct the ALU to use data stored in the atomic data buffer to perform the subsequent modification.

Example 24 may include the memory access controller of Example 19, further including a snoop monitor to detect a snoop to the memory location, wherein the atomic controller is to halt formation of the execution pipeline in response to the snoop, and a snoop response module to send a response to an originator of the snoop if all requests associated with the execution pipeline are complete, wherein the atomic controller is to restart formation of the execution pipeline after the response is sent to the originator of the snoop.

Example 25 may include a memory access controller, comprising means for performing the method of any one of Examples 7 to 12.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a display to visually present content;
a memory device including a memory location;
an arithmetic logic unit (ALU) including an atomic data buffer; and
a memory access controller coupled to the memory device and the ALU, the memory access controller including:
a request module to receive a request to perform an atomic operation with respect to the content, the request identifying the memory location;
an atomic controller to add the atomic operation to an execution pipeline of the arithmetic logic unit (ALU) for one or more pending atomic operations in response to association of the one or more pending atomic operations with the memory location, wherein at least a portion of the execution pipeline bypasses the memory location and uses the atomic data buffer; and a snoop monitor to detect a snoop to the memory location, wherein the atomic controller is to halt formation of the execution pipeline in response to the snoop.

2. The system of claim 1, wherein the atomic controller includes a linked list module to populate a linked list with a modification associated with the atomic operation to add the atomic operation to the execution pipeline, wherein the linked list is to be dedicated to the memory location.

3. The system of claim 1, wherein the memory access controller further includes:
a memory interface to initiate a read from the memory location if no pending atomic operations are associated with the memory location and receive data from the memory location,
wherein the atomic module includes a pipeline module to create an execution pipeline for the memory location; and
a data module to send the data to the ALU and instruct the ALU to perform a modification associated with the atomic operation,
wherein the pipeline module is to instruct the ALU to store a result of the modification to the atomic data buffer of the ALU.

4. The system of claim 1, wherein the memory access controller further includes:
a result module to receive a result of the atomic operation from the ALU;
an operation response module to send the result to an originator of the request to perform the atomic operation,
wherein the atomic controller includes a pipeline module to identify a next atomic operation in the execution pipeline, instruct the ALU to perform a subsequent modification associated with the next atomic operation and send a pipeline command to the ALU; and
a memory interface to defer a write to the memory location until a result of a last atomic operation in the execution pipeline is received from the ALU.

5. The system of claim 4, wherein the pipeline command is to instruct the ALU to use data stored in the atomic data buffer to perform the subsequent modification.

6. The system of claim 1, wherein the memory access controller further includes:
a snoop response module to send a response to an originator of the snoop if all requests associated with the execution pipeline are complete,
wherein the atomic controller is to restart formation of the execution pipeline after the response is sent to the originator of the snoop.

7. A method of operating a memory access controller, comprising:
receiving a request to perform an atomic operation;
adding the atomic operation to an execution pipeline of an arithmetic logic unit (ALU) for one or more pending atomic operations in response to association of the one or more pending atomic operations with a memory location identified in the request, wherein at least a portion of the execution pipeline bypasses the memory location;
detecting a snoop to the memory location; and
halting formation of the execution pipeline in response to the snoop.

8. The method of claim 7, wherein adding the atomic operation to the execution pipeline includes populating a linked list with a modification associated with the atomic operation, wherein the linked list is dedicated to the memory location.

9. The method of claim 7, further including:
initiating a read from the memory location if no pending atomic operations are associated with the memory location;
receiving data from the memory location;
creating an execution pipeline for the memory location;
sending the data to the ALU;
instructing the ALU to perform a modification associated with the atomic operation; and
instructing the ALU to store a result of the modification to an atomic data buffer of the ALU.

10. The method of claim 7, further including:
receiving a result of the atomic operation from the ALU;
sending the result to an originator of the request to perform the atomic operation;
identifying a next atomic operation in the execution pipeline;
instructing the ALU to perform a subsequent modification associated with the next atomic operation;
sending a pipeline command to the ALU; and
deferring a write to the memory location until a result of a last atomic operation in the execution pipeline is received from the ALU.

11. The method of claim 10, wherein the pipeline command instructs the ALU to use data stored in the atomic data buffer to perform the subsequent modification.

12. The method of claim 7, further including:
sending a response to an originator of the snoop if all requests associated with the execution pipeline are complete; and
restarting formation of the execution pipeline after the response is sent to the originator of the snoop.

13. At least one non-transitory computer readable storage medium comprising a set of instructions which, if executed by a memory access controller, cause the memory access controller to:
receive a request to perform an atomic operation;
add the atomic operation to an execution pipeline of an arithmetic logic unit (ALU) for one or more pending atomic operations in response to association of the one or more pending atomic operations with a memory location identified in the request, wherein at least a portion of the execution pipeline bypasses the memory location;
detect a snoop to the memory location; and
halt formation of the execution pipeline in response to the snoop.

14. The at least one non-transitory computer readable storage medium of claim 13, wherein the instructions, if executed, cause the memory access controller to populate a linked list with a modification associated with atomic operation to add the atomic operation to the execution pipeline, wherein the linked list is to be dedicated to the memory location.

15. The at least one non-transitory computer readable storage medium of claim 13, wherein the instructions, if executed, cause the memory access controller to:
initiate a read from the memory location if no pending atomic operations are associated with the memory location;
receive data from the memory location;
create an execution pipeline for the memory location;

send the data to the ALU;
instruct the ALU to perform a modification associated with the atomic operation; and
instruct the ALU to store a result of the modification to an atomic data buffer of the ALU.

16. The at least one non-transitory computer readable storage medium of claim 13, wherein the instructions, if executed, cause the memory access controller to:
receive a result of the atomic operation from the ALU;
send the result to an originator of the request to perform the atomic operation;
identify a next atomic operation in the execution pipeline;
instruct the ALU to perform a subsequent modification associated with the next atomic operation;
send a pipeline command to the ALU; and
defer a write to the memory location until a result of a last atomic operation in the execution pipeline is received from the ALU.

17. The at least one non-transitory computer readable storage medium of claim 16, wherein the pipeline command is to instruct the ALU to use data stored in the atomic data buffer to perform the subsequent modification.

18. The at least one non-transitory computer readable storage medium of claim 13, wherein the instructions, if executed, cause a memory access controller to:
send a response to an originator of the snoop if all requests associated with the execution pipeline are complete; and
restart formation of the execution pipeline after the response is sent to the originator of the snoop.

19. A memory access controller, comprising:
a request module to receive a request to perform an atomic operation;
an atomic controller to add the atomic operation to an execution pipeline of an arithmetic logic unit (ALU) for one or more pending atomic operations in response to association of the one or more pending atomic operations with a memory location identified in the request, wherein at least a portion of the execution pipeline bypasses the memory location; and
a snoop monitor to detect a snoop to the memory location, wherein the atomic controller is to halt formation of the execution pipeline in response to the snoop.

20. The memory access controller of claim 19, wherein the atomic controller includes a linked list module to populate a linked list with a modification associated with the atomic operation to add the atomic operation to the execution pipeline, wherein the linked list is to be dedicated to the memory location.

21. The memory access controller of claim 19, further including:
a memory interface to initiate a read from the memory location if no pending atomic operations are associated with the memory location and receive data from the memory location,
wherein the atomic module includes a pipeline module to create an execution pipeline for the memory location; and
a data module to send the data to the ALU and instruct the ALU to perform a modification associated with the atomic operation,
wherein the pipeline module is to instruct the ALU to store a result of the modification to an atomic data buffer of the ALU.

22. The memory access controller of claim 19, further including:
a result module to receive a result of the atomic operation from the ALU;
an operation response module to send the result to an originator of the request to perform the atomic operation,
wherein the atomic controller includes a pipeline module to identify a next atomic operation in the execution pipeline, instruct the ALU to perform a subsequent modification associated with the next atomic operation and send a pipeline command to the ALU; and
a memory interface to defer a write to the memory location until a result of a last atomic operation in the execution pipeline is received from the ALU.

23. The memory access controller of claim 22, wherein the pipeline command is to instruct the ALU to use data stored in the atomic data buffer to perform the subsequent modification.

24. The memory access controller of claim 19, further including:
a snoop response module to send a response to an originator of the snoop if all requests associated with the execution pipeline are complete,
wherein the atomic controller is to restart formation of the execution pipeline after the response is sent to the originator of the snoop.

* * * * *